United States Patent [19]

Darley et al.

[11] Patent Number: 4,878,190

[45] Date of Patent: Oct. 31, 1989

[54] FLOATING POINT/INTEGER PROCESSOR WITH DIVIDE AND SQUARE ROOT FUNCTIONS

[75] Inventors: Henry M. Darley, Plano; Michael C. Gill; Dale C. Earl, both of Dallas; Dinh T. Ngo, Irving; Paul C. Wang; Maria B. L. Hipona, both of Dallas, all of Tex.; Jim Dodrill, Durham, N.C.

[73] Assignee: Texas Instruments Incorporated, Dallas, Tex.

[21] Appl. No.: 150,363

[22] Filed: Jan. 29, 1988

[51] Int. Cl.$^4$ ................................................ G06F 7/38
[52] U.S. Cl. ...................................... 364/752; 364/761
[58] Field of Search ................ 364/761, 764, 766–767, 364/752, 715.03, 754, 757, 745

[56] References Cited

U.S. PATENT DOCUMENTS

| | | | |
|---|---|---|---|
| 3,631,230 | 12/1971 | Chen | 364/752 X |
| 4,638,449 | 1/1987 | Frey | 364/760 |
| 4,707,798 | 11/1987 | Nakamo | 364/765 |
| 4,724,529 | 2/1988 | Imkulla et al. | 364/761 |
| 4,761,758 | 8/1988 | Deczky et al. | 364/761 |

Primary Examiner—Gary V. Harkcom
Assistant Examiner—Tan V. Mai
Attorney, Agent, or Firm—George L. Craig; Thomas W. DeMond; Melvin Sharp

[57] ABSTRACT

A processor (10) operable to calculate division and square root functions comprises a multiplier (48) having a multiplier array (116), a pipeline register (50), a correction generator (122), and a converter/rounder (52). The products generated by the multiplier array (116) are fed back to the multiplier (48) to avoid delays associated with the remainder of the multiplier circuitry. The correction generator (122) which performs a subtraction of the product output form the multiplier array (116) from a constant, is disposed between the multiplier array (116) and the converter/rounder (52). Hence, the subtraction necessry to compute the next estimate may be performed in parallel with other multiplications, further reducing the time necessary to perform the calculation. Compare circuitry (120) is operable to compare the final approximation with an operand to quickly determine the direction of rounding.

14 Claims, 2 Drawing Sheets

FLOATING POINT/INTEGER PROCESSOR WITH DIVIDE AND SQUARE ROOT FUNCTIONS

RELATED APPLICATIONS

"HIGH SPEED MULTIPLIER", by Henry Merrick Darley, et al., filed concurrently herewith, Ser. No. 149,779.

"FLOATING POINT PROCESSOR ARCHITECUTRE", by Michael Caulkins Gill, et al., filed concurrently herewith Ser. No. 149,780.

TECHNICAL FIELD OF THE INVENTION

This invention relates in general to integrated circuits, and more particularly to a processor having efficient divide and square root calculation abilities.

BACKGROUND OF THE INVENTION

High speed computation is a critical design factor in many systems such as computers, signal processors and process controllers. These systems increasingly rely on LSI integrated circuits employing highly parallel designs to provide high speed calculations. Specialized integrated circuits that perform integer and floating point multiplications using parallel techniques are widely available. However, integrated circuits that perform the division and square root functions are generally serial in nature, thereby reducing their effectiveness.

Division can be performed by high speed multipliers in conjunction with other circuitry by using well known convergence algorithms. Generally, high speed parallel multipliers can be divided into two major parts. The first part contains the partial product generators and an adder array that reduces the partial products to a sum and carry stream. The second part contains a final adder that sums the carry and sum stream together. Because the second part involves a carry chain, the final addition consumes approximately the same amount of time as the partial product generation and addition. A pipeline register is often inserted between the two halves to increase the throughput of the multiplier, since the first half can start the next operation while the second half completes the original calculation.

As a result, high speed parallel multipliers require at least three clock cycles for each iteration of the convergence algorithm. Hence, division and square root calculations require a substantial amount of time relative to other calculations.

Therefore, a need has arisen in the industry to provide a processor which is capable of high speed division and square root calculations.

SUMMARY OF THE INVENTION

In accordance with the present invention, a processor is provided which substantially eliminates or prevents the disadvantages and problems associated with prior division and square root calculations.

The processor of the present invention comprises a multiplier having a first array portion for generating a sum of partial products. A second portion of the multiplier is operable to convert the output of the first portion into a predetermined representation. Feedback circuitry connects the output of the first portion to the multiplier inputs, in order to avoid delays associated with the converter circuitry. In the preferred embodiment, the first array portion comprises a signed digit multiplier array.

This aspect of the present invention provides the technical advantage that delays associated with prior art processor in performing division and square root calculations are avoided, thereby producing a result in less time.

In a second aspect of the present invention, a correction generator is provided between the first and second portions of the multiplier in order to generate a number to be used in the next approximation in parallel with a multiplication being performed in the first portion. This aspect of the present invention provides the technical advantage of increase processing speed.

In a third aspect of the present invention, compare circuitry is provided to quickly determine the direction in which the final approximation of a division calculation or a square root calculation should be rounded. For division calculations, the final approximation of the quotient is multiplied by the divisor and is compared with the dividend. The direction of rounding may be based on whether the dividend is greater than, less than, or equal to the calculated product. In the case of the square root, the final approximation of the square root is multiplied by itself and compared to the operand. The rounding may be based on whether the operand is greater than, less than or equal to the square of the approximated square root.

This aspect of the invention provides the technical advantage that the rounding of the final approximation may be performed rapidly, with a minimum of compare circuitry, since only the least significant bit of the operand need be compared with the corresponding bit of the approximation, plus the guard bits on either side.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

Figure 1:
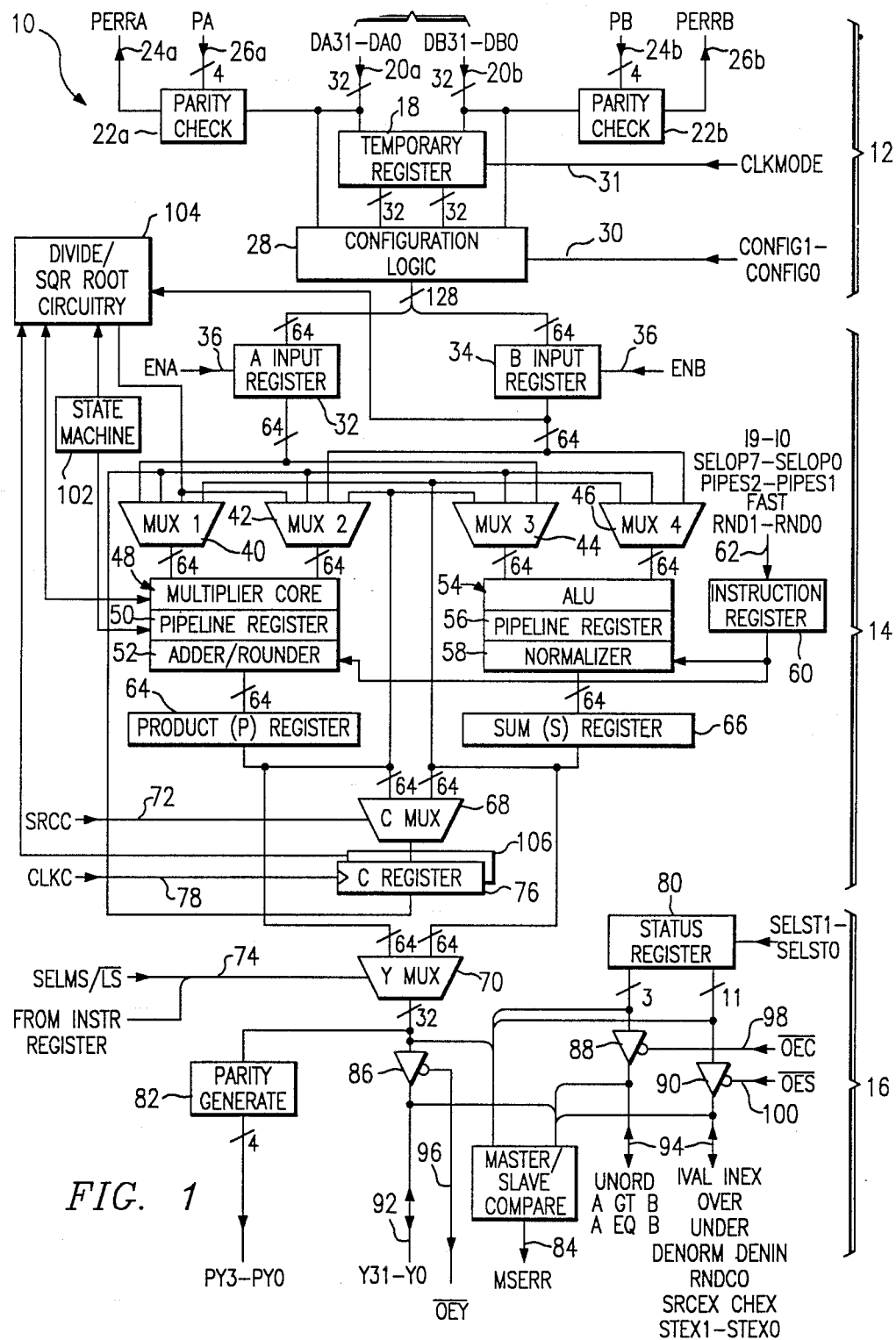
FIG. 1 illustrates the architecture of the processor of the present invention.
Figure 2:
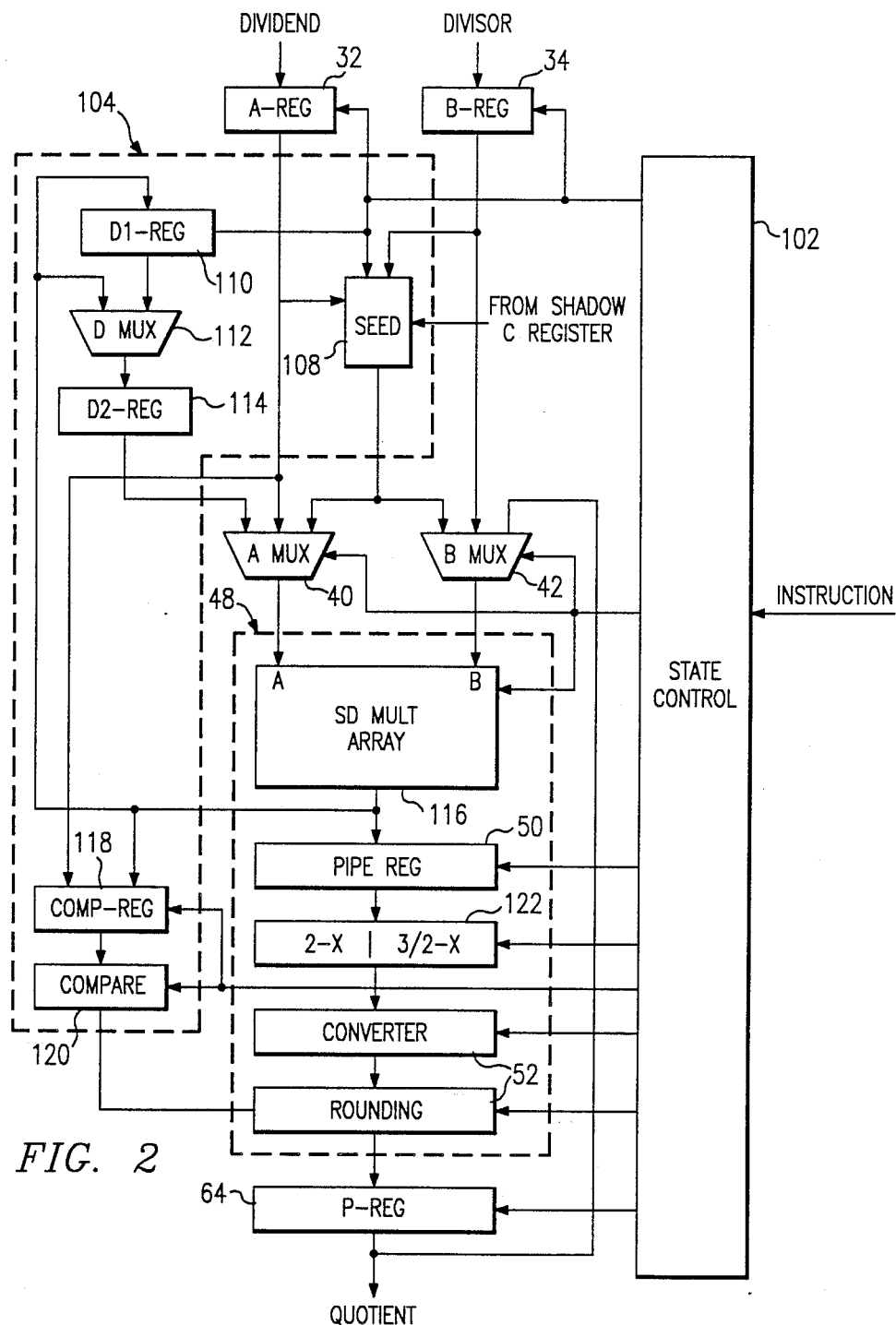
FIG. 2 illustrates a detailed block diagram of the circuitry used in the division and square root calculations.

The preferred embodiment of the present invention is best understood by referring to FIGS. 1-2 of the drawings, like numerals being used for like and corresponding parts of the various drawings.

FIG. 1 illustrates a circuit diagram of the processor of the present invention. The processor 10 of the present invention is shown in three stages: an input stage 12, a computation stage 14 and an output stage 16. The input stage comprises a temporary register 18 connected to the input data bus 20 comprised of the A input data bus 20a and the B input data bus 20b. The parity checkers 22a-b are connected to the input data buses 20a-b, respectively, and to parity lines 24a-b. Parity error lines 26a-b are output from the parity checkers 22a-b. The input data buses 20a-b are also connected to configuration logic 28 along with the outputs of the temporary register 18. A configuration control signal 30 and a "clock mode" signal 31 are input to the configuration logic 28.

The output of the configuration logic 28 is connected to A and B input registers 32 and 34. Enable signal lines 36 and 38 are connected to the A input register 32 and B input register 34, respectively. The A and B input registers 32 and 34 are connected to a series of multiplexers 40, 42, 44, and 46. The A input register 32 is connected to multiplexer 40 and multiplexer 44, and the B input register 34 is connected to multiplexer 42 and multiplexer 46. The output of the multiplexers 40 and 42 are input to a multiplier 48 having a pipeline register 50 and a converter/rounder 52. Multiplexers 44 and 46 are connected to an ALU 54 having a pipeline register 56 and a normalizer 58. The multiplier 48 and the ALU 54 are connected to an instruction register 60, which is connected to the instruction bus 62. The output of the multiplier 48 is connected to a product register 64 and the output of the ALU 54 is connected to a sum register 66. The outputs of the product register 64 and the sum register 66 are connected to multiplexers 68 and 70. The output of the product register 64 is also connected to multiplexers 42 and 44, while the output of the sum register 66 is connected to multiplexers 40 and 46. The multiplexers 68 and 70 are connected to control signal lines 72 and 74, respectively.

The output of the multiplexer 68 is connected to the C register 76. The output of the C register 76 is connected to the multiplexers 40-46. The C register 78 is connected to clock signal line 78.

The output stage 16 comprises the Y multiplexer 70, a status register 80, a parity generator 82, and a master/slave compare 84. The output of the multiplexer 70 is connected to the parity generator 82, the master/slave compare 84, and a buffer 86. The status register 80 is connected to the master/slave compare 84 and to buffers 88 and 90. The output of buffer 86 is connected to the output data bus 92 and to the master/slave compare 84. The output of the buffers 88 and 90 are connected to a status bus 94. The buffers 86-90 are controlled by control lines 96, 98 and 100, respectively.

A state machine 102 is connected to the multiplier 48 and divide/square root circuitry 104 (as well as to the A and B input registers 32 and 34 and multiplexers 40-46, the connections being not shown for illustrative purposes) The divide/square root circuitry 104 is also connected to the multiplier 48, the B register 34, the multiplexer 40, and to a "shadow" C register 106. The shadow C register 106 is used to store the result of a integer to floating point number conversion by the ALU 54 to assist in integer divide and square root calculations. The divide/square root circuitry is shown in greater detail in connection with FIG. 2.

The input stage 12 is designed to provide flexible input modes to accommodate a variety of bus designs. The configuration control signal comprises a two-bit signal, indicating one of four configurations for double precision input. The possible configurations are shown in Table 1.

TABLE 1

DOUBLE PRECISION INPUT DATA CONFIGURATION MODES

| | | LOADING SEQUENCE | | | |
|---|---|---|---|---|---|
| | | Data loaded into temp register on first clock and A/B registers on second clock | | Data loaded into A/B registers on second clocks | |
| Config 1 | Config 0 | A bus | B bus | A bus | B bus |
| 0 | 0 | B operand | B operand | A operand | A operand |
| 0 | 1 | (MSH) A operand (LSH) | (LSH) B operand (LSH) | (MSH) A operand (MSH) | (LSH) B operand (MSH) |
| 1 | 0 | A operand (MSH) | B operand (MSH) | A operand (LSH) | B operand (LSH) |
| 1 | 1 | A operand (MSH) | A operand (LSH) | B operand (MSH) | B operand (LSH) |

MSH = Most Significant Half
LSH = Least Significant Half

In each case, data is loaded from the A and B input data buses 20a-b into the temporary register 18 on a first clock cycle. On the rising edge of the second clock cycle, the new data on the A and B input data buses 20a-b and the data in the temporary register 18 is transferred to the appropriate registers. The configuration control signal 30 allows the user to configure his data in various ways. In Table 1, the B operand refers to the operand that will be loaded into the B register 34, and the A operand refers to the operand that will be loaded into A register 32.

The temporary register 18 is provided to enable double precision numbers on a single precision bus to be loaded in one clock cycle. The contents of the A bus 20a are loaded into the upper thirty-two bits of the temporary register; the contents of the B bus 20b are loaded into the lower thirty-two bits. The clock mode signal 31 determines the clock edge on which the data will be stored in the temporary register. When the clock mode signal 31 is low, data is loaded on the rising edge of the clock; when the clock mode signal 31 is high, data is loaded on the falling edge of the clock. By loading the A and B register 32 and 34 on the falling edge of the clock, two double precision numbers may be loaded in a single clock cycle, since the contents of the A and B buses 20a-b, and the temporary register 18 are loaded into the A and B registers 32 and 34 on the next rising edge.

The four multiplexers 40-46 select the operands which will be connected to the multiplier 48 and the ALU 54. The multiplexers 40-46 select the operands from the A input register 32, B input register 34, product register 64, sum register 66, or C register 76. The multiplexer configuration significantly reduces impediments in the data flow.

The ALU 54 provides addition and subtraction functions and conversions between integer and floating point numbers, and between single precision and double precision numbers. In an important aspect of the invention, the ALU may be operated independently or in parallel with the multiplier 48. The ALU 54 includes a pipeline register 56 and a rounder/normalizer 58.

The multiplier 48 performs a basic multiply function, a*b. The operands can be single precision or double precision numbers and can be converted to absolute values before multiplication takes place.

The pipeline registers 50 and 56 may be disabled to allow a flow through mode.

In "chained" instructions, wherein both the ALU 54 and multiplier 48 are operated simultaneously, several functions may be performed. The ALU operation may be chosen to implement a+b, a−b, 2−a, b−a. The ALU and multiplier results may be negated, and identity functions may be chosen for the ALU 54 and multiplier 48, i.e., a+0 and b*1.

The results of ALU and multiplier operations are latched into two output registers, the sum register 66 and the product register 64, on the rising edge of the system clock. The product register 64 holds the result of the multiplier operation and the sum register 66 holds the result of the ALU operation.

The C register is available for temporary storage of the results of an ALU or multiplier operation before feedback to the multiplier 48 or ALU 54 or it can hold a constant. The data source for the C register 76 is selected by the multiplexer 68 via the control signal line 72.

The C register does not load directly from an external data bus; however, it may be loaded without wasting a cycle by inputting the value as an A operand during an operation which uses only the ALU or multiplier and requires no external data input. Since B operand can be forced to zero in the ALU or to one in the multiplier, the A operand can be passed to the C register either by adding zero or multiplying by one, then selecting the input source to the C register 76.

The parity generator 82 generates parity bits for the Y multiplexer output 70, either for each byte or for each word of output.

The master/slave comparator 84 is provided to compare data bytes from the Y output multiplexer 70 and the outputs of the data register 80 with data on the external output bus 92 and status bus 94. If the data bytes are not equal, a high signal is generated on the masters/slave error output pin of the master/slave comparitor 84. During a compare operation in the ALU, the AEQB output of the status register 80 goes high when the A and B operands are equal. If the A operand is greater than the B operand during a compare, the AGTB output goes high in the status register 80. When any operation other than a compare is performed, either by the ALU or the multiplier, the AEQB signal is used as a zero detect.

The processor 10 may be programmed to operate in a FAST mode. In the FAST mode, all denormalized inputs and outputs are forced to zero. A denormalized input has a form of a floating-point number with a zero exponent, a nonzero mantissa, and a zero in the left most bit of the mantissa (hidden or implicit bit). A denormalized number results from decrementing the biased exponent field to zero before normalization is complete. Since a denormalized number cannot be input to the multiplier, it must first be converted to a wrapped number by the ALU. When the mantissa of the denormalized number is normalized by shifting it to the left, the exponent field decrements from all zeros to a negative two's complement number.

The processor 10 supports four IEEE standard rounding modes. The rounding modes supported are round to nearest, round toward zero (truncate), round toward infinity (round up), and round toward minus infinity (round down). The ability of the processor to simultaneously perform multiplication and addition functions allows fast calculations of a sum of products or a product of sums. To calculate a sum of products, the processor 10 can operate on external data inputs in the multiplier while the ALU operates on feedback from the previous calculation. Conversely, to calculate product of sums, the ALU operates on external data inputs while the multiplier operates on feedback from the previous calculation.

Table 2 illustrates the operations used in multiplying sets of data operands and accumulating the results, the basic operations involved in computing a sum of products. In Table 2, the sum of four products is calculated. In Table 2, the P( ) and S( ) refer to the quantity stored in the product register 64 and sum register 66, respectively.

TABLE 2

| Clock Cycle | Single Precision Sum of Products Multiplier/ALU Operations |
|---|---|
| 1 | Load $A_1$, $B_1$ |
|   | $A_1 * B_1$ |
| 2 | Pass $P(A_1B_1)$ to S |
|   | Load $A_2$, $B_2$ |
|   | $A_2 * B_2$ |
| 3 | $S(A_1B_1) + P(A_2B_2)$ |
|   | Load $A_3$, $B_3$ |
|   | $A_3 * B_3$ |
| 4 | $S(A_1B_1 + A_2B_2) + P(A_3B_3)$ |
|   | Load $A_4$, $B_4$ |
|   | $A_4 * B_4$ |
| 5 | $S(A_1B_1 + A_2B_2 + A_3B_3) + P(A_4B_4)$ |
| 6 | New Instruction |

Where long streams of sums of products or product of sums are to be calculated, the processor 10 of the present invention substantially reduces the time necessary to complete the computation. Therefore, the present invention offers greatly enhanced speed over prior art processors.

The divide/square root circuitry 104 is illustrated in greater detail in connection with FIG. 2. The divide/square root circuitry 104 comprises a seed generator 108 connected to the D1 register 110, B register 34 and the shadow C register 106 and A register 32. The seed generator 108 has outputs connected to the multiplexers 40 and 42 connected to the multiplier 48. A D1 register 110 is connected to a D multiplexer 112 which is connected to a D2 register 114. The D2 register is connected to the multiplexer 40. The D1 register 110 and the D multiplexer 112 are connected to the signed digit multiplier array 116 of the multiplier 48.

A compare register 118 receives input from the A register 32 and the signed digit multiplier array 116. The output of compare register 118 is connected to the compare logic 120, which outputs to the converter/rounder 52 of the multiplier 48. An correction generator 122 is connected between the pipeline register 50 and the converter/rounder 52. The state controller 102 is connected to the A and B registers, the seed generator 108, the D1 register 110, the D multiplexer 112, the D2 register 114, the compare register 118, the compare logic 120, the multiplexers 40 and 42, the pipeline register 50, the correction generator 122, the converter/rounder 52, and the product register 64. Not shown in FIG. 2 is the exponent handling circuitry which subtracts the exponents of the floating point inputs during a divide.

Recently, sign digit multiplication has been introduced as a way to reduce layout complexity. Sign digit multiplication is described in N. Takagi, H. Yassurah and S. Yajima, *High-Speed VLSI Multiplication Algorithm With A Redundant Binary Addition Tree*, IEEE TRANSACTIONS ON COMPUTERS, Vol. C-34, No. 9, September, 1985, pp. 789-795, and in U. S. patent application Ser. No. 149,779, entitled "High-Speed Multiplier", to Darley et al., filed concurrently herewith. Because signed digit numbers can be added without a carry chain, the first half of the signed digit multiplier, the signed digit multiplier array 116, can reduce partial products to a single number without a carry propagating add. The second half of the multiplier, the converter/rounder 52, is still needed to convert the signed digit result to a normal magnitude number.

In the illustrated embodiment of the processor 10, the A register 32 is used to hold the dividend and the B register 34 is used to hold the divisor. The dividend and the divisor may be loaded externally using the input section 12. The D1 and D2 registers are used to hold intermediate results in the division calculation, as is the pipeline register 50. The product register 64 holds the intermediate results and the quotient. The compare register 118 holds an intermediate result for use in rounding the quotient.

The seed generator 108 computes an approximation to 1/B, where B is the divisor. The seed generator is typically a logic array; for design simplicity, only normalized floating point numbers are input to the seed generator 108. Hence, the need for the shadow C register 106 is provided for holding the result of an integer to floating point conversion of the divisor from the ALU 54.

The sign digit multiplier array 116 multiplies the number selected by the A multiplexer 40 by the number selected by the B multiplexer 42 to obtain a sign digit product. The input values may be either signed digit or magnitude representations.

The correction generator 122 subtracts the result of the signed digit multiply from a value of two in a division calculation, and from a value of three halves in a square root calculation and also performs a shift function. The converter/rounder 52 is operable to convert a signed digit number to a magnitude number with the same value. The rounder portion of the converter/rounder 52 rounds the input number to a number with appropriate IEEE format.

In operation, the processor 10 of the present invention may perform division for a 24-bit number in seven clock cycles, including the final rounding of the quotient. In clock cycle zero, the seed is generated in the seed generator 108 in response to the number in the B register 34 (the divisor). Normally, the eight most significant bits are used to generate the seed. The seed, S0, is chosen to approximate 1/B, where B is the divisor. A look-up RAM or a PLA is a convenient way to generate the seed.

The seed, F0 is multiplied by the divisor, B, to obtain a result G1. Since G1 is equal to B times an approximation to 1/B, it should be close to one in value. The multiplication is performed by routing the seed to the A multiplexer 40 and the divisor to the B multiplexer 42. The value G1 is stored in the pipeline register 50 and in the D1 register 110.

In clock cycle one, the first approximation of the quotient, Q1, is obtained by multiplying the dividend, A, from the A register 32 by the seed, F0, from the seed generator 108. The dividend is routed through the A multiplexer 40 and the seed is routed through the B multiplexer 42. Also during clock cycle one, G1 is routed through the D multiplexer 112 to the D2 register 114 and is routed from the pipeline register 50 through the correction generator 122 where it is subtracted from a value of two and converted into a magnitude number F1. The value F1 is stored in the product register 64. Q1 is output from the signed digit multiplier array 116 and is stored in he D1 register 110.

In clock cycle two, G1, presently stored in the D2 register 114, is routed through the A multiplexer 40 and multiplied by F1, stored in the product register 64, which is routed through the B multiplexer 42. The result, G2, is a closer approximation to one. G2 is stored in the D1 register 110 and the first quotient approximation, Q1, is moved from the D1 register to the D2 register 114 through the D multiplexer 112.

In clock cycle three, the second approximation of the quotient, Q2, is obtained by multiplying Q1 by F1. Q1, presently in the D2 register 114 is routed to the signed digit multiplier array 116 through the A multiplexer 40 and F1, still stored in the product register 64, is routed through the B multiplexer 42. The second approximate quotient Q2 is stored in the D2 register 114. Also during clock cycle three, G2, stored in the pipeline register 50, is subtracted from two in the correction generator 122 and is converted to a magnitude number F2, which is stored in the product register 64.

In clock cycle four, the final approximation of the quotient, Qf (the third quotient approximation) is obtained by multiplying Q2 by F2. Q2 is routed from the D2 register 114 through the A multiplexer 40 and F2 is routed from the product register 64 to the B multiplexer 42. The final approximate quotient $Q_f$ is stored in the pipeline register 50 and in the D2 register 114. For a 24-bit division, the final approximation is known to be within one-quarter of a least significant bit of the infinitely precise result.

In clock cycle five, an approximate dividend is obtained by multiplying $Q_f$ by the original divisor B (still stored in the B register 34). The result of $B*Q_f$ should approximate the dividend A, since $Q_f$ approximates A/B.

In clock cycle six, the approximate dividend is compared with the original dividend, to determine which is larger, if the dividend and approximate dividend are not equal. Based on this result, $Q_f$ can be correctly rounded in any of the four IEEE modes to obtain the correct IEEE quotient which is stored in register P.

The processor 10 of the present invention may also be used to calculate square roots. In a square root calculation, the operand, A, is stored in the A register 32. In clock cycle zero, a seed, F0, is generated in the seed generator 108. The seed, F0, is an approximation to the reciprocal of the square root of the operand, A. The seed, F0, is routed to the signed digit multiplexer array 116 through the B multiplexer 42 and is multiplied by the operand, A. The result, R1, is the first approximation to the square root and is stored in the D1 and D2 registers 110 and 114.

In cycle one, R1 is multiplied by the seed, F0, resulting in G1, which should approximate the value "1". G1 is stored in the pipeline register 50.

In cycle two, R1 is again multiplied by the seed, F0, again resulting in G1, which is stored in the D2 register 114. G1 is stored in the pipeline register is subtracted from three and divided by two in the correction generator 122. The division by "2" may be implemented by right shift of the number after subtraction from 3. The result is converted into a magnitude number F1 and stored in the product register 64.

In clock cycle three, F1 is routed from the product register 64 to the signed digit multiplier array 116 and multiplied by the value G1 stored in the D2 register 114. The intermediate result, I2, equal to F1*G1 is stored in the D2 register 114.

In cycle four, F1 is multiplied by I2 to obtain G2, which is stored in the pipeline register 50. R1 is transferred from D1 to D2.

In cycle five, F1, still in the product register 64, is multiplied by R1, which is stored in the D2 register 114. The product is the second approximation of the square root, R2, which is stored in the D2 register 114. G2, which is stored in the pipeline register 50, is subtracted from three and divided by two in the correction generator 122. The result is converted to a magnitude number F2 is stored in the product register 64.

In clock cycle six, F2 is multiplied by R2 to obtain the final approximation to the square root, $R_f$. $R_f$ is stored in the pipeline register 50 and in the D2 register 114.

In clock cycle seven, $R_f$ is converted to a magnitude number and stored in the product register 64. In clock cycle eight, the $R_f$ stored in the product register 64 is multiplied by the $R_f$ stored in the D2 register 114 and is stored in the pipeline register 50. The result of the approximation of the square root times itself should approximate the operand stored in the A register 32.

In clock cycle nine, the square of the final approximate root, $R_f$, is compared with the original operand stored in the A register 32 to determine which is larger or whether they are equal. Based on this result, $R_f$ can be directly rounded in any of the four IEEE modes to obtain the correct IEEE root which is stored in the product register 64.

The rounding circuitry, comprising the compare register 118, compare logic 120, and converter/rounder 52 has significant advantages over the prior art. The compare logic 120 is operable to compare a signed digit number to a conventional number, so that the final multiplication does not have to be converted to a conventional number prior to rounding. The compare logic 120 compares only the least significant bit of the conventional number with the least significant bit and the guard bits of the signed digit number. Only these bits need be compared, since the number of iterations necessary to achieve such accuracy may be predetermined for any operand bit length.

Integer divides may be implemented by converting the multiplicand to a floating point representation using the ALU 54. The result of the integer to floating point representation is stored in the shadow C register 106. The seed is generated from the value stored in the shadow C register 106. After calculating the quotient, the ALU 54 is used to convert the floating point result into an integer representation.

The processor described herein provides significant advantages over prior art devices in performing the division and square root calculations. The feedback path between the signed digit multiplier array 116 and the D1 and D2 registers 110 and 114 is before the pipeline register 50 and conversion circuitry 52, avoiding the delays associated therewith. Further, a simple constant subtracter and level shifter can be used to implement the correction generator after the pipeline register. Therefore, the data path normally used for conversion is also used to perform the necessary subtraction. The converter is left in the data path so that after subtraction, the value is converted to a magnitude number. This simplifies the design of the signed digit multiplier array 116, since the port associated with the B multiplexer 42 need only accept magnitude numbers. It should be noted that the converter is also needed to convert the final answer to a magnitude number, and does not add any delay to the divide operation.

The constant subtraction in the correction generator 122 and subsequent conversion to a magnitude number is done in parallel with the next multiplication, further increasing the speed of the division.

It should also be noted that a similar approach could be obtained using a Wallace pipeline multiplier, feeding back both the sum and carry stream. In this case, another level of adder must be added to accommodate the feedback of two numbers instead of one.

Hence, the present invention has the significant advantage of rapidly calculating division and square root functions by avoiding delays associated with pipeline registers and converters, and by simultaneously performing multiplications with the constant subtraction (and division by two for square roots). Furthermore, the circuit has the further advantage of increasing the speed at which the final result may be rounded to an IEEE convention.

Although the present invention has been described in detail, it should be understood that various changes, substitutions and alterations can be made herein without departing from the spirit and scope of the invention as defined by the appended claims.

What is claimed is:

1. Apparatus for calculating a selected value of a quotient or a square root of an operand, comprising:
   multiplier circuitry having at least first and second inputs receiving first and second numeric signals respectively, said multiplier circuitry including a first portion for producing a product of the first and second numeric signals representing an approximation of the value and a second portion for producing a conversion of said product into a predetermined numeric representation;
   first feedback circuitry transmitting said conversion to the first input of the multiplier circuitry; and
   second feedback circuitry transmitting said product to the second input of said multiplier circuitry.

2. The apparatus of claim 1 wherein said multiplier circuitry further includes a subtracter connected between said first portion and said second portion for subtracting said product from a constant value.

3. The apparatus of claim 1 wherein said multiplier circuitry further includes a pipeline register connected between said first portion and said subtracter.

4. The apparatus of claim 1 wherein said first portion includes circuitry to produce a signed digit product.

5. The apparatus of claim 1 wherein said second numeric signal can be a signed digit number or a binary number.

6. The apparatus of claim 1 wherein said second feedback circuitry includes a first memory coupled between said first portion and said first input of said multiplier circuitry.

7. The apparatus of claim 1 wherein said second feedback circuitry further includes:
   a first multiplexer coupled between the first memory and a second memory; and
   a second multiplexer coupled between the second memory and the second input to the multiplier circuitry.

8. The apparatus of claim 1 wherein the selected value is the quotient and further includes a seed generator coupled to the first and second inputs of said multiplier circuitry for generating an approximation of the reciprocal of a divisor of the operand.

9. The apparatus of claim 8 wherein the second multiplexer receives signals from the second memory, the seed generator, a first register storing the operand, and a state control circuit and transmits as output said second numeric signal.

10. The apparatus of claim 8 wherein a third multiplexer receives signals from the seed generator, the second portion of the multiplier circuitry, a second register storing the divisor and the state control circuit.

11. The apparatus of claim 8 wherein said second portion further includes rounding and compare circuitry coupled between said second portion and said second feedback circuitry for comparing a product of the quotient and the divisor with the operand for determining a direction for rounding the quotient.

12. The apparatus of claim 1 wherein the selected value is the square root and further includes a seed generator coupled to the first and second inputs of said multiplier circuitry for generating an approximation of a reciprocal of the square root of the operand.

13. The apparatus of claim 1 wherein said second portion further includes rounding and compare circuitry coupled between said second portion and said second feedback circuitry for comparing a square of the square root with the operand for determining a direction for rounding the square root.

14. The apparatus of claim 1 wherein said predetermined numeric representation is a binary magnitude representation.

* * * * *